United States Patent
Williams

(10) Patent No.: US 6,501,802 B1
(45) Date of Patent: Dec. 31, 2002

(54) DIGITAL SILENCE FOR A PCM DATA COMMUNICATION SYSTEM

(75) Inventor: Richard G. C. Williams, San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/239,229

(22) Filed: Jan. 29, 1999

Related U.S. Application Data

(60) Provisional application No. 60/073,109, filed on Jan. 30, 1998.

(51) Int. Cl.[7] .............................................. H04B 14/04
(52) U.S. Cl. ...................................................... 375/242
(58) Field of Search ................................ 375/242, 241, 375/243, 254, 285; 370/522, 523, 524

(56) References Cited

U.S. PATENT DOCUMENTS

| | | |
|---|---|---|
| 5,267,300 A | 11/1993 | Kao et al. |
| 5,376,929 A * | 12/1994 | Rakolta et al. |
| 5,382,949 A * | 1/1995 | Mock et al. |
| 5,396,239 A * | 3/1995 | McMahon et al. ............ 341/58 |
| 5,579,369 A | 11/1996 | Feiner et al. |
| 6,111,834 A * | 8/2000 | Rub et al. |

FOREIGN PATENT DOCUMENTS

WO    WO 96/18261    6/1996

OTHER PUBLICATIONS

International Search Report for PCT application Ser. No. PCT/US99/02005, Dated May 20, 1999.

* cited by examiner

*Primary Examiner*—Jean Corrielus
(74) *Attorney, Agent, or Firm*—McDonnell Boehnen Hulbert & Berghoff

(57) ABSTRACT

A method of transmitting a quite, or zero, signal in a PCM communication system. The zero signal is specified universally in ordered set terms for either $\mu$-Law or A-Law PCM systems, which has minimal energy in the A-Law system, and contains no energy within the $\mu$-Law system. The signal is preferably specified as a repetition of six intervals (or multiple thereof) because the DTN can modify PCM codes on a six interval period by the robbed-bit signaling mechanism. The zero signal may be used to detect network elements that produce single-signed zero outputs from zero inputs of either sign. In addition, by examination of the zero signal the receiver may determine whether the channel includes an analog link or connection.

12 Claims, 6 Drawing Sheets

FIG. 2A
PRIOR ART

| Ucode | μ-law PCM | μ-law linear | A-law PCM | A-law linear |
|---|---|---|---|---|
| 0 | FF | 0 | D5 | 8 |
| 1 | FE | 8 | D4 | 24 |
| 2 | FD | 16 | D7 | 40 |
| 3 | FC | 24 | D6 | 56 |
| 4 | FB | 32 | D1 | 72 |
| 5 | FA | 40 | D0 | 88 |
| 6 | F9 | 48 | D3 | 104 |
| 7 | F8 | 56 | D2 | 120 |
| 8 | F7 | 64 | DD | 136 |
| 9 | F6 | 72 | DC | 152 |
| 10 | F5 | 80 | DF | 168 |
| 11 | F4 | 88 | DE | 184 |
| 12 | F3 | 96 | D9 | 200 |
| 13 | F2 | 104 | D8 | 216 |
| 14 | F1 | 112 | DB | 232 |
| 15 | F0 | 120 | DA | 248 |
| 16 | EF | 132 | C5 | 264 |
| 17 | EE | 148 | C4 | 280 |
| 18 | ED | 164 | C7 | 296 |
| 19 | EC | 180 | C6 | 312 |
| 20 | EB | 196 | C1 | 328 |
| 21 | EA | 212 | C0 | 344 |
| 22 | E9 | 228 | C3 | 360 |
| 23 | E8 | 244 | C2 | 376 |
| 24 | E7 | 260 | CD | 392 |
| 25 | E6 | 276 | CC | 408 |
| 26 | E5 | 292 | CF | 424 |
| 27 | E4 | 308 | CE | 440 |
| 28 | E3 | 324 | C9 | 456 |
| 29 | E2 | 340 | C8 | 472 |
| 30 | E1 | 356 | CB | 488 |
| 31 | E0 | 372 | CA | 504 |
| 32 | DF | 396 | F5 | 528 |
| 33 | DE | 428 | F4 | 560 |
| 34 | DD | 460 | F7 | 592 |
| 35 | DC | 492 | F6 | 624 |
| 36 | DB | 524 | F1 | 656 |
| 37 | DA | 556 | F0 | 688 |
| 38 | D9 | 588 | F3 | 720 |
| 39 | D8 | 620 | F2 | 752 |
| 40 | D7 | 652 | FD | 784 |
| 41 | D6 | 684 | FC | 816 |
| 42 | D5 | 716 | FF | 848 |

FIG. 2B
PRIOR ART

| Ucode | μ-law PCM | μ-law linear | A-law PCM | A-law linear |
|---|---|---|---|---|
| 43 | D4 | 748 | FE | 880 |
| 44 | D3 | 780 | F9 | 912 |
| 45 | D2 | 812 | F8 | 944 |
| 46 | D1 | 844 | FB | 976 |
| 47 | D0 | 876 | FA | 1008 |
| 48 | CF | 924 | E5 | 1056 |
| 49 | CE | 988 | E4 | 1120 |
| 50 | CD | 1052 | E7 | 1184 |
| 51 | CC | 1116 | E6 | 1248 |
| 52 | CB | 1180 | E1 | 1312 |
| 53 | CA | 1244 | E0 | 1376 |
| 54 | C9 | 1308 | E3 | 1440 |
| 55 | C8 | 1372 | E2 | 1504 |
| 56 | C7 | 1436 | ED | 1568 |
| 57 | C6 | 1500 | EC | 1632 |
| 58 | C5 | 1564 | EF | 1696 |
| 59 | C4 | 1628 | EE | 1760 |
| 60 | C3 | 1692 | E9 | 1824 |
| 61 | C2 | 1756 | E8 | 1888 |
| 62 | C1 | 1820 | EB | 1952 |
| 63 | C0 | 1884 | EA | 2016 |
| 64 | BF | 1980 | 95 | 2112 |
| 65 | BE | 2108 | 94 | 2240 |
| 66 | BD | 2236 | 97 | 2368 |
| 67 | BC | 2364 | 96 | 2496 |
| 68 | BB | 2492 | 91 | 2624 |
| 69 | BA | 2620 | 90 | 2752 |
| 70 | B9 | 2748 | 93 | 2880 |
| 71 | B8 | 2876 | 92 | 3008 |
| 72 | B7 | 3004 | 9D | 3136 |
| 73 | B6 | 3132 | 9C | 3264 |
| 74 | B5 | 3260 | 9F | 3392 |
| 75 | B4 | 3388 | 9E | 3520 |
| 76 | B3 | 3516 | 99 | 3648 |
| 77 | B2 | 3644 | 98 | 3776 |
| 78 | B1 | 3772 | 9B | 3904 |
| 79 | B0 | 3900 | 9A | 4032 |
| 80 | AF | 4092 | 85 | 4224 |
| 81 | AE | 4348 | 84 | 4480 |
| 82 | AD | 4604 | 87 | 4736 |
| 83 | AC | 4860 | 86 | 4992 |
| 84 | AB | 5116 | 81 | 5248 |
| 85 | AA | 5372 | 80 | 5504 |

FIG. 2C
PRIOR ART

| Ucode | μ-law PCM | μ-law linear | A-law PCM | A-law linear |
|---|---|---|---|---|
| 86 | A9 | 5628 | 83 | 5760 |
| 87 | A8 | 5884 | 82 | 6016 |
| 88 | A7 | 6140 | 8D | 6272 |
| 89 | A6 | 6396 | 8C | 6528 |
| 90 | A5 | 6652 | 8F | 6784 |
| 91 | A4 | 6908 | 8E | 7040 |
| 92 | A3 | 7164 | 89 | 7296 |
| 93 | A2 | 7420 | 88 | 7552 |
| 94 | A1 | 7676 | 8B | 7808 |
| 95 | A0 | 7932 | 8A | 8064 |
| 96 | 9F | 8316 | B5 | 8448 |
| 97 | 9E | 8828 | B4 | 8960 |
| 98 | 9D | 9340 | B7 | 9472 |
| 99 | 9C | 9852 | B6 | 9984 |
| 100 | 9B | 10364 | B1 | 10496 |
| 101 | 9A | 10876 | B0 | 11008 |
| 102 | 99 | 11388 | B3 | 11520 |
| 103 | 98 | 11900 | B2 | 12032 |
| 104 | 97 | 12412 | BD | 12544 |
| 105 | 96 | 12924 | BC | 13056 |
| 106 | 95 | 13436 | BF | 13568 |
| 107 | 95 | 13948 | BE | 14080 |
| 108 | 93 | 14460 | B9 | 14592 |
| 109 | 92 | 14972 | B8 | 15104 |
| 110 | 91 | 15484 | BB | 15616 |
| 111 | 90 | 15996 | BA | 16128 |
| 112 | 8F | 16764 | A5 | 16896 |
| 113 | 8E | 17788 | A4 | 17920 |
| 114 | 8D | 18812 | A7 | 18944 |
| 115 | 8C | 19836 | A6 | 19968 |
| 116 | 8B | 20860 | A1 | 20992 |
| 117 | 8A | 21884 | A0 | 22016 |
| 118 | 89 | 22908 | A3 | 23040 |
| 119 | 88 | 23932 | A2 | 24064 |
| 120 | 87 | 24956 | AD | 25088 |
| 121 | 86 | 25980 | AC | 26112 |
| 122 | 85 | 27004 | AF | 27136 |
| 123 | 84 | 28028 | AE | 28160 |
| 124 | 83 | 29052 | A9 | 29184 |
| 125 | 82 | 30076 | A8 | 30208 |
| 126 | 81 | 31100 | AB | 31232 |
| 127 | 80 | 32124 | AA | 32256 |

DIGITAL SILENCE FOR A PCM DATA COMMUNICATION SYSTEM

RELATED APPLICATION

This application claims the benefit under 35 U.S.C. §119 (e) of U.S. Provisional Patent Application Serial No. 60/073,109, filed Jan. 30, 1998, entitled "Digital Silence for a PCM Data Communication System" for all common subject matter disclosed therein.

BACKGROUND OF THE INVENTION

The present invention relates to a method for generating and transmitting "silence" for use in a Pulse Code Modulation (PCM) data communication system. The communication system of particular interest herein uses the public digital telephone network (DTN) to transmit data directly from a digital source to a remote unit, where the remote unit is connected to the DTN either digitally or via an analog local loop. Within this PCM data communication system it is desirable to utilize a "zero" signal. The signaling method described herein a method of forming and transmitting a zero signal, and is compatible with both the $\mu$-Law and A-Law PCM coding, and minimizes the impact of coding differences between the two PCM coding systems.

Presently, typical modems used to communicate over the public telephone system represent binary data by an analog waveform that is modulated in response to the binary data. As an example, one such standard for modem communications is detailed in the International Telecommunication Union, Telecommunication Standardization Sector ("ITU-T") Recommendation V.34 (1994). The waveform is in turn analyzed at a receiving modem to recover the binary data. For modem signals transmitted over the public telephone system, the analog waveforms are treated by central office facilities in the same manner as if the waveforms were analog voice signals. In other words, the waveforms are digitized into eight bit octets by an analog to digital converter (ADC) codec at the central office, and the octets are transmitted in digital format between central offices until they are converted back to an analog signal by a digital to analog converter (DAC) codec at the central office that is connected to the receiving subscriber loop. The public switched telephone network has operated in this manner for many years.

The data rate attainable by a modem operating in such an environment is limited by numerous factors including, in particular, the codec sample rate and the number and spacing of quantization levels of the codec converters at the central office switches. The effect on an analog signal associated with sampling the signal amplitude and representing the sample by one of a finite number of discrete (digital) values is generally referred to as quantization noise. Most telephone switches utilize voice codecs that perform nonlinear A/D and D/A conversions known as $\mu$-law or A-law conversion. In these conversion formats, the 8-bit codec codewords, also referred to as octets, represent analog voltages that are nonlinearly spaced. This type of conversion performs well for voice signals intended for a human listener (especially when transmitted over a noisy line), but have a negative impact on modulated analog waveforms associated with modems. Specifically, codecs that adhere to these standard nonlinear conversion formats use nonlinearly spaced quantization levels, and have the effect of increasing quantization noise which is detrimental to modulated analog waveforms.

Until recently, it was thought that the maximum attainable data rate for signals passing through the DTN was limited by the quantization noise associated with the codecs. However, it has been recognized that a data distribution system can overcome certain aspects of the aforesaid limitations by providing a digital data source connected directly to the DTN, without any intervening ADC or DAC. In such a system, the telephone network routes digital signals from the data source to the client's local subscriber loop without any intermediary analog facilities, such that the only analog portion of the link from server to client is the client's local loop (plus the associated analog electronics at both ends of the loop). The only DAC in the transmission path is the one at the Telephone Company's end of the client's subscriber loop. In such a system digital data can be converted into PCM codes, and fed to the DTN as 8-bit bytes (octets) at the network's clock rate of 8 kHz. At the distant end, the DTN's DAC converts each byte to one of 255 analog voltage levels in a system utilizing $\mu$-law encoding (or 256 levels in an A-law system), which is sent over the client's subscriber loop and received by a subscriber device (i.e., a modem) at the client's location.

FIG. 1 shows a block diagram of a PCM data distribution system. The system includes a data source 10, or server, having a direct digital connection 30 to a digital telephone network (DTN) 20. A client 40 is connected to the DTN 30 by a subscriber loop 50 that is typically a two-wire, or twisted-pair, cable. The DTN routes digital signals from the data source 10 to the client's local subscriber loop without any intermediary analog facilities such that the only analog portion of the link from the server to the client is the client's local loop 50. The analog portion thus includes the channel characteristics of the local loop transmission line plus the associated analog electronics at both ends of the line. This typically includes a subscriber line interface card at the central office that includes a codec, as well as circuitry used to generate and interpret call progress signals (ring voltage, on-hook and off-hook detection, etc.). The only D/A converter in the transmission path from the server to the client is the one at the DTN end of the client's subscriber loop. It is understood that the client-side, or subscriber-side, equipment may incorporate an A/D and D/A for its internal signal processing, as is typical of present day modem devices. For the reverse channel, the only A/D converter in the path from the client to the server is also at the Telephone Company's end of the client's subscriber loop.

An alternative system is one where connection 50, like connection 30, is a digital connection to subscriber unit 40. In such a system there are preferably no analog transmission links, that is, the digital PCM codewords are not converted to one of a plurality of an analog voltage levels, but transmitted directly to unit 40 in binary form. Of course, at the physical layer, the transmission of the binary signals or codewords is performed by transmitting voltage levels representing logic signals having values of "1" and "0".

The conversion from octet to analog voltage is well known, and is based on a system called $\mu$-law coding in North America. In Europe, a format known as A-law coding is used. Theoretically, there are 256 points represented by the 256 possible octets, or $\mu$-law/A-law codewords. FIGS. 2A–C show the positive values of the $\mu$-law and A-law codewords. There are one hundred twenty eight values, and a total of two hundred fifty six values including the negatives. The codewords are given in hexadecimal format, and are ordered according to the corresponding analog voltage level. Note that the analog level is calibrated in integers from 0 to 32,124. These numbers correspond to a linear 16-bit A/D converter. As is known to those of ordinary skill in the art, the sixteenth bit is a sign bit which provides integers from 0 to −32124 which correspond to the first 128 octets (hexadecimal 0 to 7F), not shown in FIG. 2 or 3.

FIG. 3 plots the μ-law codewords versus the analog voltage level. FIG. 3 can be viewed as a conversion between the logarithmic binary data and the corresponding linear 16-bit binary data. It can also be seen in FIG. 3 that the logarithmic function of the standard μ-law conversion format is approximated by a series of 8 linear segments.

The format of the μ-law codewords is shown in FIG. 4, where the most significant bit $b_7$ indicates the sign, the three bits $b_6$–$b_4$ represent the linear segment, and the four bits, $b_0$–$b_3$ indicate the step along the particular linear segment. These points are symmetric about zero; i.e., there are 128 positive and 128 negative levels, including two encodings of zero. Since there are 254 points not including zero, the maximum number of bits that can be sent per signaling interval in a system having an analog link in the channel (symbol) is just under 8 bits. In an all digital system, all 256 octets may be utilized, resulting in eight bits per signaling interval. Other factors, such as noise, digital attenuation (pads), channel distortion introduced by the subscriber loop, and the crowding of points at the smaller voltage amplitudes and the associated difficulty in distinguishing between them at the decoder/receiver, may reduce the maximum attainable bit rate. Note that the A-law format, however, has no codewords corresponding to an analog voltage level of zero volts. As seen in FIG. 2A, the codeword D5 represents a linear value of 8, the smallest linear value. The corresponding negative codeword having a linear value of −8 is obtained by changing the sign bit, and is hexadecimal 55.

In the system shown in FIG. 1, digital data can be input to the DTN as 8-bit bytes (octets) at the DTN's clock rate of 8 kHz. This is commonly referred to as a DS-0 signal format. In the system having an analog subscriber loop, the DTN's interface to the subscriber loop includes a codec that converts each byte to one of 256 analog voltage levels (although two of these are zero volts in the μ-law system). These voltage levels are sent over the client's subscriber loop and received by a decoder at the client's location. As shown in FIG. 3, the analog voltages, or points, corresponding to the quantization levels are non-uniformly spaced and follow a generally logarithmic curve. As can be seen in FIG. 3, the increment in the analog voltage levels produced from one codeword to the next is not linear, but depends on the mapping as shown.

Certain network connections utilize a supervisory signaling technique called Robbed Bit Signaling (RBS). On RBS links, the least significant bit (LSB) of the PCM code is usurped, or "robbed", by the network periodically and used to convey control information. The PCM codes from different channels are grouped together and multiplexed into frames, typically 24 DS-0 channels plus a framing bit, to create a DS-1 signal that may be sent over a T-1 carrier system. In typical robbed bit signaling, the T-1 carrier system uses the LSB of every channel, every sixth frame, for sending control and status information between network equipment. Thus, each DS-0 user loses the use of the LSB every sixth octet (once per every sixth DS-1 frame). Ordinarily, these channels are used for voice communications, and the bit robbing merely increases quantization noise of the effected time slots. The effect of robbed bit signaling on voice quality is barely perceptible to the human ear.

To control power levels, some networks impose digital attenuators. Unlike analog attenuators, a network digital attenuator (NDA) is not linear. Because there are a finite number of digital levels to choose from, the NDA will be unable to divide each codeword exactly. This causes distortion of the analog level ultimately transmitted by the DAC over the subscriber loop. For example, if the NDA is designed to reduce voltage levels by ½ (6 dB), then PCM code 130 will attenuate to code 146, and the corresponding analog levels will not be related exactly by a factor of ½. Also, NDAs can produce code ambiguities, which happens more frequently with codes corresponding to small absolute linear values. Specifically, more than one codeword may be reduced to the same attenuated codeword, resulting in an ambiguity. Another type of ambiguity may be introduced when low-amplitude codewords of positive and negative values pass through an NDA and are transformed to a codeword having the smallest magnitude, but perhaps having a positive value. That is, e.g., in a μ-law format, both negative and positive zeroes (hex values 7F and FF) are converted to the same codeword.

At certain points in data transmission, it is desirable for the devices used at each end of the above-described data transmission system to transmit silence, or the equivalent of an analog zero voltage level. The silence is often transmitted before the nature of the channel is fully determined. That is, the device may attempt to transmit a zero signal over a channel that may include NDAs or RBS signaling, or may be fully digital end-to-end, or may have analog portions of the channel. These impairments will interfere with the transmission of the desired zero signal.

SUMMARY OF THE INVENTION

A method of transmitting a quite, or zero, signal in a PCM communication system is provided. The zero signal is specified universally in ordered set terms for either μ-Law or A-Law PCM systems, which has minimal energy in the A-Law system, and contains no energy within the μ-Law system. The signal is preferably specified as a repetition of six intervals (or multiple thereof) because the DTN can modify PCM codes on a six interval period by the robbed-bit signaling mechanism. The zero signal may be used to detect network elements that produce single-signed zero outputs from zero inputs of either sign. In addition, by examination of the zero signal the receiver may determine whether the channel includes an analog link or connection.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIGS. 2A–C show a table of PCM codewords in the μ-law, A-law and analog values;

DETAILED DESCRIPTION OF THE PREFERRED EMBODIMENT

Figure 1:
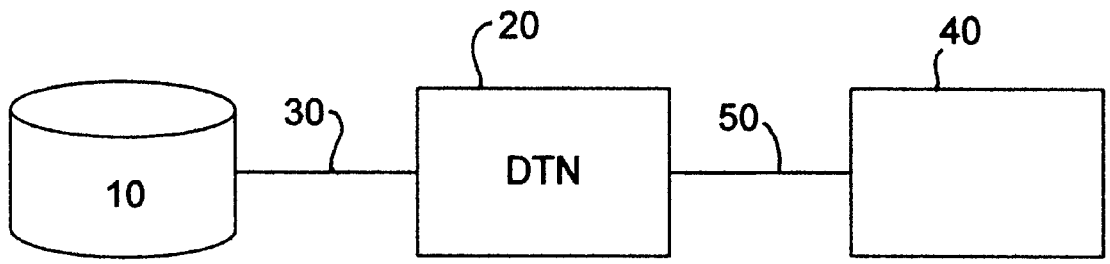
FIG. 1 depicts a communications network with a data source having direct digital access to the DTN.
Figure 4:
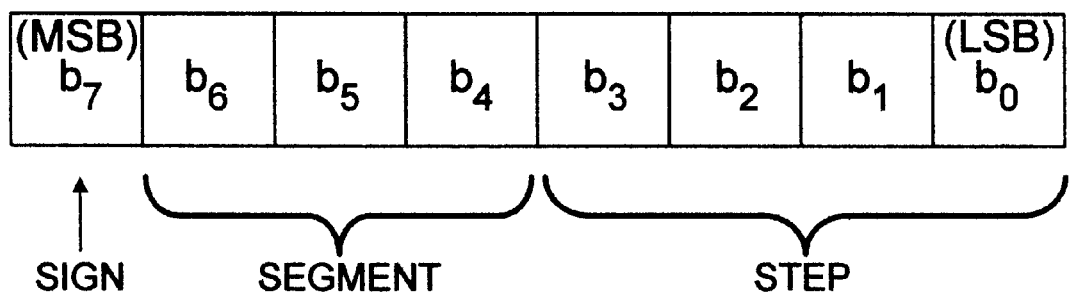
FIG. 4 shows the elements of a μ-law codeword.
Figure 3:
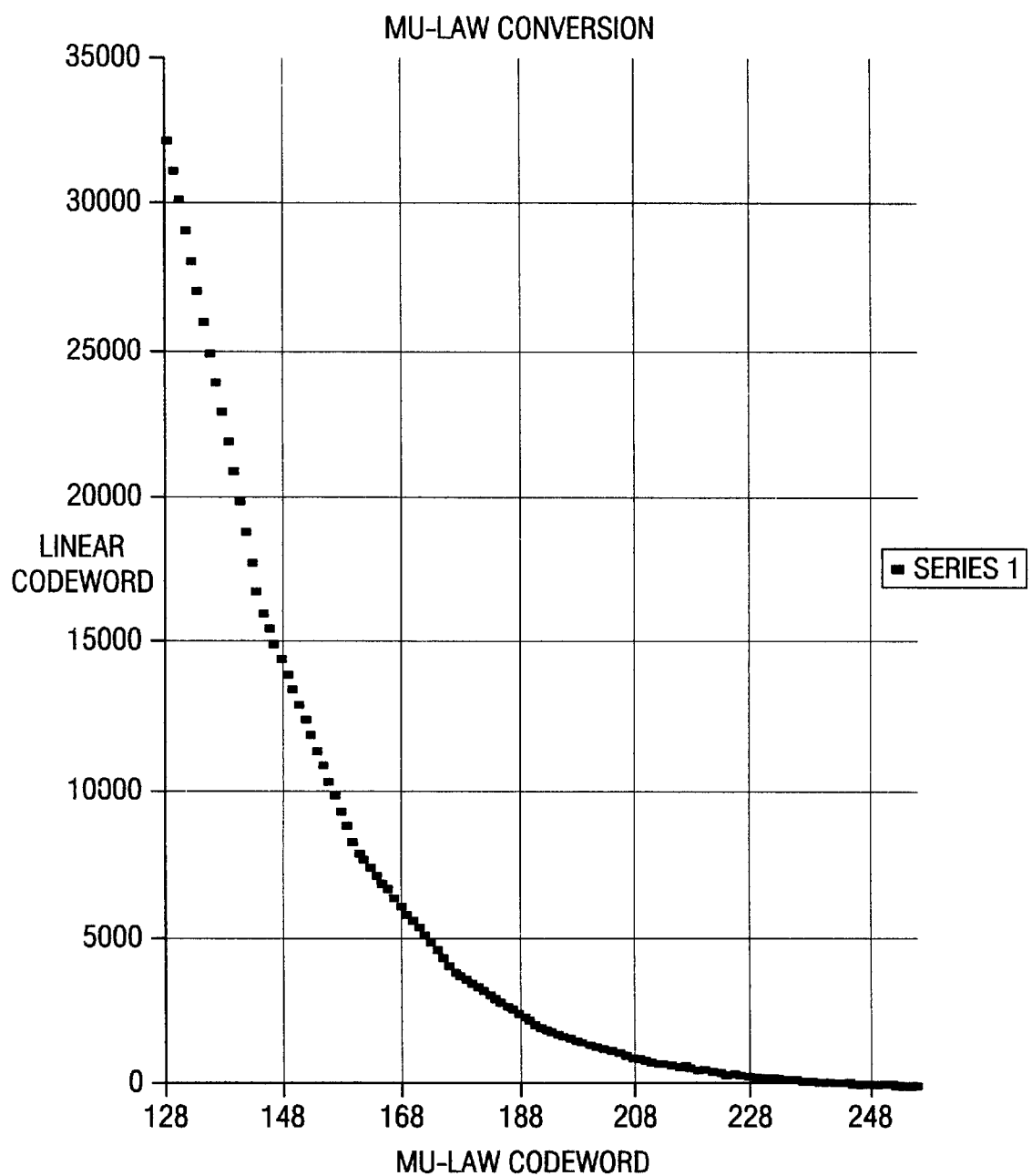
FIG. 3 shows a μ-law to linear conversion graph.

The Table of FIGS. 2A–C shows the values commonly accepted for conversion between the μ-Law and A-Law PCM systems. The column labeled Ucode are an ordering, of smallest to largest of the codewords in each PCM standard as set forth in Recommendation V.90, published by the International Telecomunicaitons Union (ITU). The μ-Law PCM and A-Law PCM columns are the eight bit hexidecimal codeword value within the coding system. The two columns marked "μ-law linear" and "A-law linear" contain linear representations of the PCM codewords corresponding to the two encoding schemes. The linear values are scaled to correspond to a range of ±32,768. This scale is selected for convenience, as it represents the decimal equivalent of a sixteen bit binary number. Negative values are not shown, but can be created by making the most significant bit of the codeword zero, rather than one, with a corresponding negation of the linear table entries. Thus Ucode 0 corresponds to A-law codeword D5, representing a linear value of 8. The negative of this is A-law codeword 55, representing a linear value of –8. The Ucode 0 corresponds to codeword FF in a μ-law system. FF represents a linear zero value. The negative of this corresponds to 7F, which, in this case, also represents a linear zero value. This is because the μ-law encoding has two separate values for zero.

Note the differences between the linear values corresponding to Ucode 0. Within the A-Law system this corresponds to a linear value of 8, and within the μ-Law system, this has a linear value of zero. Thus, within an A-law system, it is not possible to send a "zero" signal. It is possible to send a constant DC level in such a system, however, it is preferable to send a signal that has a small amount of energy, but no DC bias. This is in part because of the transient response of DTN transmission elements.

The preferred zero signal is periodic over a single 6 octet frame, or periodic over a plurality of frames. Generally, a periodic low-amplitude (linear value) sequence is preferred. One preferred signal is repetition of the sequence FF,FF,FF, 7F,7F,7F within the μ-Law system, and the corresponding D5,D5,D5,55,55,55 within the A-Law system. Another preferred signal is the μ-Law FF,7F,FF,7F,FF,7F and the corresponding D5,55,D5,55,D5,55 in A-Law. Note that the signals set forth above are periodic over a six codeword cycle. The preferred signals are transmitted over the communication channel when the transmission of a zero signal is desired.

The transmission of the zero signal is performed by first selecting minimum energy codewords and their opposites. For example, in μ-law, the opposite of FF is 7F, and in A-law, the opposite of D5 is 55. Other codeword pairs corresponding to low energy linear values may alternatively be used, or may be combined with those above. The selected codewords of both signs (codewords corresponding to positive and negative linear values) are then formed into a cyclic pattern having a period of a multiple of six codewords. The period may be exactly 6 codewords, 12 codewords, 18 codewords, etc. Slight aperiodicity of the codewords of the zero signal may be tolerated, but is not preferred. The codewords are then supplied to the digital telephone network.

Figure 5:
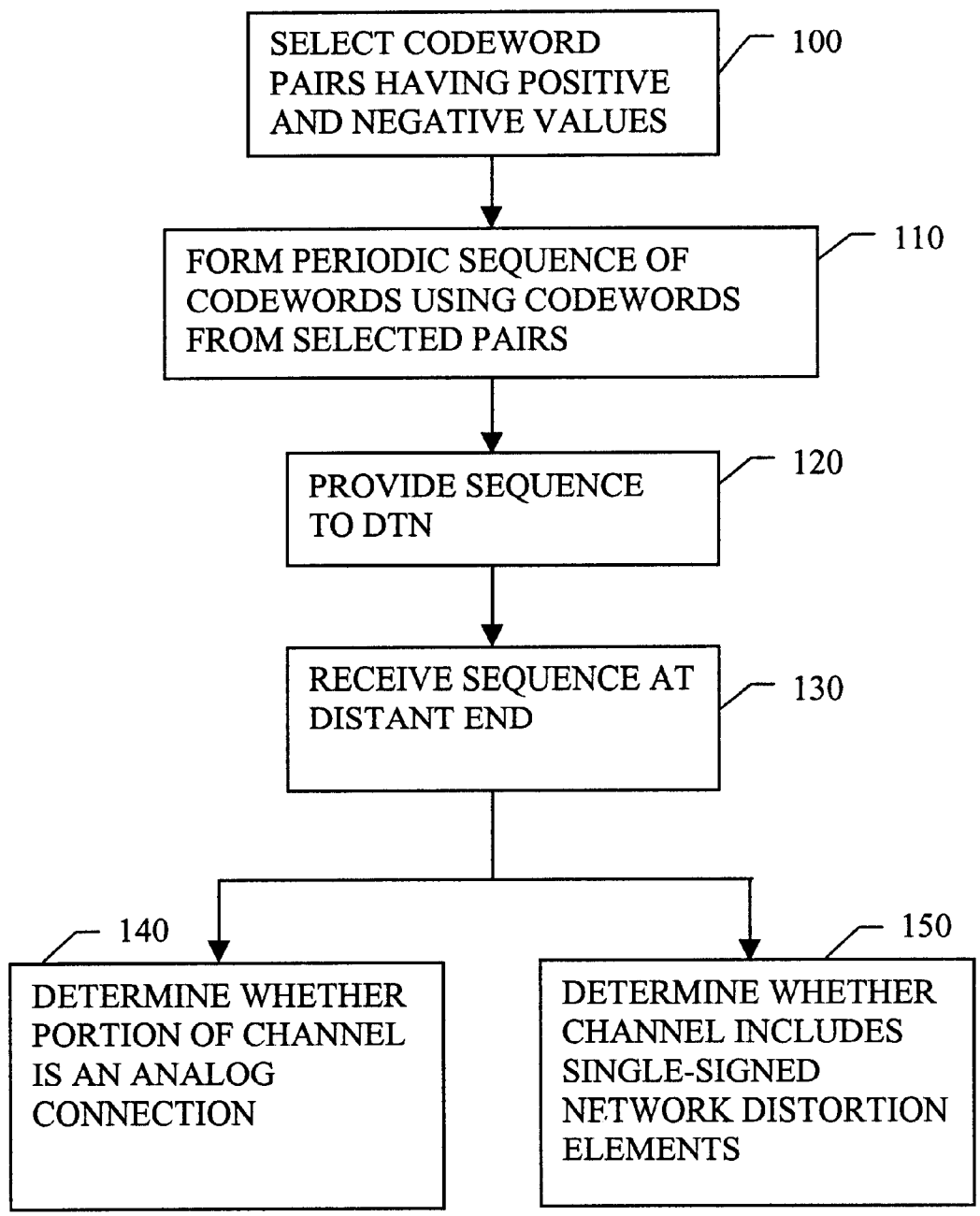
FIG. 5 shows a flow diagram of the method of transmitting a zero signal.

With reference to FIG. 5, the method described above includes the step 100 of selecting codeword pairs having positive and negative values. The codeword pair FF and 7F is one such pair. Step 110 involves forming a periodic sequence of codewords using codewords from the pairs selected in step 100. In step 120, the sequence is provided to the DTN. In step 130, the sequence is received at the distant end.

The communications receiver may utilize the zero signal to detect network elements that produce single-signed zero outputs from zero inputs of either sign. Specifically, the zero signal having minimum energy codewords of both signs as described above will be converted by some network elements into minimum energy codewords of a single sign. Step 150 of FIG. 5 depicts this step taken by the receiver to determine whether channel includes single-signed network distortion elements In addition, the receiver may determine if the channel includes an analog link or connection. If an analog portion exists, for example if the system has an inter-switch analog trunk line, the codewords will be converted to an analog waveform for transmission over the trunk line, and then re-converted back to a PCM codeword. The noise inherent in analog transmission systems will be added to the analog voltage level, and when the level is re-converted back to a PCM codeword, distortion in the quantization will result in corrupted codewords. Step 140 of FIG. 5 is to determine if the connection includes an analog link by analyzing the received codewords for distortion.

A preferred embodiment of the present invention has been described herein. It is to be understood, of course, that changes and modifications may be made in the embodiment without departing from the true scope of the present invention, as defined by the appended claims.

I claim:

1. A method of transmitting a minimal energy signal comprising the steps of:
   selecting at least one pair of minimal energy codewords comprising a minimal energy codeword and a corresponding opposite codeword;
   forming a frame comprising a sequence of codewords selected from said at least one pair of codewords; and,
   providing said sequence to a digital telephone network (DTN).

2. The method of claim 1 wherein said sequence is periodic, having a period equal to a multiple of six codewords.

3. The method of claim 1 wherein said at least one pair of minimal energy codewords comprises hexadecimal values FF and 7F.

4. The method of claim 1 wherein said at least one pair of minimal energy codewords comprises hexadecimal values D5 and 55.

5. The method of claim 1 further comprising the step of determining the presence of network elements that produce single-signed zero outputs from zero inputs of either sign.

6. The method of claim 1 further comprising the step of determining whether a channel includes an analog link or connection.

7. A method for transmitting a Pulse-Code-Modulation (PCM) signal through a digital telephone network (DTN), the method comprising the steps of:
   selecting a zero signal codeword pair, the zero signal codeword pair comprising a minimum energy codeword and an opposite codeword, where the minimum energy codeword corresponds to a zero signal for a channel of the DTN;
   forming a transmission frame comprising a sequence of codewords selected from the zero signal codeword pair; and
   when transmission of the zero signal is desired, transmitting the transmission frame over the channel.

8. The method of claim 7, where the step of forming a transmission frame includes selecting the sequence of codewords to be periodic having a period equal to a multiple of six codewords.

9. The method of claim 7, where the channel further comprises a μ-law PCM channel and the step of selecting a zero signal codeword pair further comprises selecting a hexadecimal value of FF for the minimum energy codeword and a hexadecimal value of 7F for the opposite codeword.

10. The method of claim 7, where the channel further comprises an A-law PCM channel and the step of selecting a zero signal codeword pair further comprises selecting a hexadecimal value of D5 for the minimum energy codeword and a hexadecimal value of 55 for the opposite codeword.

11. The method of claim 7, the method further including the steps of:

receiving the transmission frame over the channel of the DTN; and determining a presence of DTN elements that produce single-signed zero outputs from zero inputs of either sign.

12. The method of claim 7, the method further including the steps of:

receiving the transmission frame over the channel of the DTN; and analyzing codewords of the received transmission frame for distortion in order to determine whether the channel of the DTN includes an analog link.

\* \* \* \* \*